INVENTOR.
CHARLES A. ZIEGLER
BY Weingarten,
Orenbuch
& Lahive
ATTORNEYS 3,344,273
APPARATUS FOR ANALYZING A GASEOUS MEDIUM BY SUBJECTING THE GAS TO ELECTRON BOMBARDMENT AND MEASURING THE CHARACTERISTIC X-RAY EMISSION
Charles Albert Ziegler, Saxonville, Mass., assignor to Parametrics, Inc., Waltham, Mass., a corporation of Massachusetts
Filed Sept. 24, 1964, Ser. No. 398,874
5 Claims. (Cl. 250—43.5)

This application is a continuation-in-part of pending patent application Ser. No. 152,509, filed Nov. 15, 1961, now U.S. Patent 3,154,681, entitled "Method and Apparatus for Measuring Local Gas Densities in a Rarefied Gaseous Medium."

This invention relates to a method and apparatus for determining gas density and composition in a rarefied gaseous medium. In particular, it relates to a method and apparatus for determining the density and composition of a selected volume of gas situated in such medium remote from the measuring apparatus.

The advent of high altitude rockets and aircraft has provided the means for carrying instruments for determining the characteristics of the atmosphere into the outer reaches of the earth's atmosphere, that is, above 75 kilometers in altitude. There are serious errors inherent in conventional devices for determining atmospheric density and chemical composition in the altitude region indicated. Indirect methods employing several diaphragm pressure sensors positioned on a rocket have been used in conjunction with aerodynamic theory to obtain atmospheric density. These methods, however, require accurate knowledge of rocket velocity and aspect and errors in these values are compounded in the derived density value. Ionization gauges can be used to measure atmospheric density at altitudes above 100 kilometers as well as methods based on voltage breakdown, glow discharge, thermal conductivity and hypsometry. However, all these methods are inaccurate since the measured air is in, or very near, the measuring apparatus and thus not necessarily representative of atmospheric air.

Other techniques using microwaves, ultraviolet light and electron beams can in theory sample air at some distance away from the rocket thus avoiding air that has been perturbed both by the passage of the rocket and outgassing from the surface of the rocket. None of these methods, however, has as yet been employed in a rocket sonde because of various faults. Thus, the size, weight and power requirements of the microwave apparatus are too large to allow its use in sounding rockets. Methods based on ultraviolet light scattering are subject to serious interference from environmental background except for night-time use and also, are subject to a large uncertainty due to atmospheric dust particles. Four techniques using an electron beam as a probe for measuring gas density have been described in this prior art (see B. W. Schumacher, Nucleonics, vol. 18, No. 10, page 106). These techniques are: electron attenuation, electron single-scatter, electron-induced gas fluorescence and electron back-scatter. Of these, the first two require a geometric positioning of the electron source and detector that precludes their convenient use in a rocket, since the in-line arrangement of source and detector necessitates an aerodynamically undesirable structural support for at least one of these components extending out from the body of the rocket. The electron induced gas fluorescence method (also described in Schumacher et al., U.S. Patent 2,952,776), is only suitable for night-time rocket use because of the high incidence of interfering radiation from the day-time environmental background. The electron back-scatter method is operable at high altitudes but for electron scattering angles greater than 100° (necessary for convenient rocket use) requires substantially more power than the method and apparatus which is the subject of this invention. Determination of the composition of the gases by microwave and fluorescence methods is similarly limited.

It is an important object of this invention to provide a method and apparatus that can be conveniently mounted in a rocket and used to measure atmospheric density and composition at high altitudes, by sampling air located sufficiently far from the rocket to be truly representative of atmospheric density and thus free from perturbations due to the motion of the air around the rocket and to outgassing from the rocket surface.

It is a further object of this invention to provide a method and apparatus that is compact, low-weight and requires minimal power suitable for battery operation in small sounding rockets and in high altitude aircraft for the accurate measurement of atmospheric density and composition.

These and other advantageous objects will become apparent from the following specification and appended drawings.

This invention comprises generally the steps of directing a well-defined electron beam into a rarefied gaseous medium and measuring the X-ray radiation produced by interaction of the electron beam with the atoms in a selected volume of said medium.

In measuring density the measured parameter is the number of "bremsstrahlung" X-ray photons generated by said interaction, preferably those photons having energies of between 2 and 10 kev. so as to distinguish them from cosmic and solar radiation. "Bremsstrahlung" is electromagnetic radiation which results from the deceleration of charged particles, e.g., electrons, as they pass the coulomb field of an atomic nucleus. The X-ray photon energy spectrum is continuous extending from a maximum energy limit equal to the kinetic energy of the incident electron on down to zero. The differential cross section for the emission of a photon in the energy range between $E$ and $E+dE$ by incident electrons of kinetic energy $T$ and total energy $T+m_0c^2$ ($m_0c^2$=energy of electron mass=511 kev.) can be written $$d\sigma = \sigma_0 BZ^2 \left(\frac{T+M_0c^2}{T}\right) \frac{dE}{E} \text{ cm.}^2/\text{atom}$$

This equation is discussed in the book by R. D. Evans, "The Atomic Nucleus" (McGraw-Hill Book Co., 1955, New York), page 603. The previously undefined symbols in this equation are $\sigma_0$=a constant $5.8 \times 10^{-28}$ cm.$^2$/atom
$Z$=the atomic number of the gas atoms
$B$=a parameter which is a slowly varying function of $Z$ and $T$ and for the energies and atoms of concern in this invention is equal to 16/3

For $T \ll m_0c^2$ the emission of X-rays is of equal intensity in all directions and the probability, $P$, of the emission of a photon with energy between $E$ and $E+dE$, per unit path length travelled by an electron in a gas is given by $$P = nd\sigma$$

Where $n$ is the number of atoms per unit volume of the gas and $n$ is equal to $N_0 \zeta/A$ where $N_0$ is Avogadro's number ($6.024 \times 10^{23}$), $\zeta$ is the mass density and $A$ the atomic weight of the gas. If the gas is composed of atoms of more than one type, it is apparent that the probability for X-ray creation by a single electron is:

$$P = N_0 \zeta \Sigma_i (\psi_i d\sigma_i)/A_i$$

where $\psi_i$ is the fraction by weight of the gas comprised by the $i^{th}$ type atoms and the summation taken over all the types present. Air, for example, is composed of roughly 80 percent nitrogen and 20 percent oxygen.

The attenuation of the electron beam between the gun and the sampled gas volume is negligible at pressures less than $10^{-3}$ mm. of mercury for distances of several feet if energies of 3 to 10 kev. are used and the attenuation of the resulting X-rays photons generated along the beam is even less over a corresponding distance. It is therefore apparent from the expression for the probability of X-ray generation for a single electron that the number of X-ray photons generated in the sample volume is proportional to the total number of electrons in the beam (which can be measured) the density of the gas and the type of atoms present. Since in application the gas composition is known (in the atmosphere the gas composition does not vary appreciably from sea-level to over 200 km.) the number of X-rays generated is directly proportional to gas density if the beam current is known.

Inherent advantages of this method are that the bremsstrahlung X-ray generation is completely independent of the temperature of the gas and thus the resulting density determination is free from any uncertainties due to gas temperature and also the method measures density directly in terms of the total number of gas atoms present in a well-defined region of the gaseous medium.

For measurement of the composition of the gaseous medium the principle of operation is somewhat different. In this measurement the electron beam energy is set sufficiently high to excite characteristic X-rays in the gaseous elements to be identified. By providing for energy discrimination in the X-ray detector the amount of X-rays of the characteristic energy for each element to be identified can be determined. Such measurements are of course extremely useful in identifying gas element ratios, such as the argon nitrogen ratio in the atmosphere at various altitudes.

The invention will now be described in connection with the accompanying drawing in which.

Figure 1:
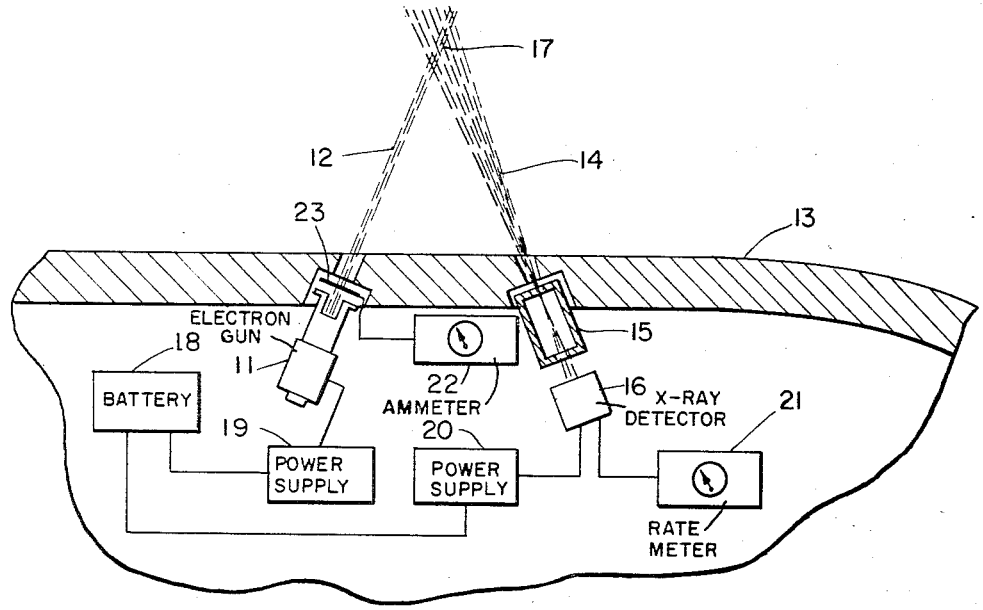
FIG. 1 is a schematic view of the apparatus according to this invention as it might be embodied for use in a rocket for the measurement of atmospheric density.

In FIG. 1 an electron gun 11 generates a well-defined beam of electrons 12 which passes through a hole in the skin of the rocket 13 and emerges into the rarefied air surrounding the rocket. The electron-atom interactions produce X-ray radiation along the path of electrons. The field of view 14 provided by a collimator 15 for an X-ray detector 16 allows only X-rays created in the defined volume 17 to be detected. A battery 18 supplies power for the electron gun power supply 19 and the X-ray detector power supply 20. The number of X-ray photons detected in a known time interval is measured by conventional means well known in this art such as a ratemeter and recorder 21. The number of electrons in the electron beam is measured by means of a pick-off wire 23 located at the exit of the gun which collects a small constant fraction of the beam which is measured as an electric current by an ammeter 22. It will be apparent to those skilled in the art that means previously described in the art can be used to obtain the count rate of the detector as a current. This latter current can then be compared using conventional electronic means with the known fractional part of the beam current and thus density could be measured as the ratio of these two currents. This has the advantage that current stability of the electron beam would not be required. Alternatively, if standard means are used to control the beam current within known values, then the count rate of the detector alone is sufficient to indicate density.

The X-ray detector itself can be of various conventional types such as a Geiger tube, proportional counter, or scintillation counter. (See Rossi and Stoeb "Ionization Chambers," McGraw-Hill, New York, 1949.) The electron gun design can be of design previously described in the art, as for example, British Patent 777,426.

Figure 2:
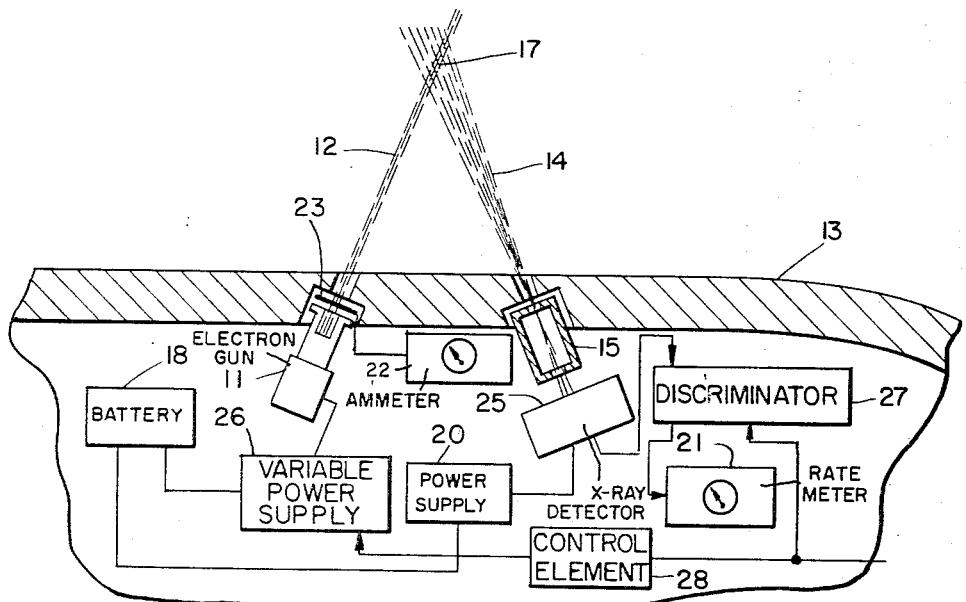
FIG. 2 is a block diagram of an apparatus in accordance with this invention for measurement of gaseous composition.

Referring now to FIG. 2, a second embodiment of the invention suitable for measurement of gas composition is shown. In FIG. 2 like numbers refer to like parts of FIG. 1. An electron gun 11 again provides a well-defined electron beam 12 through an opening in the rocket wall 13. The energy of the electrons in the beam is governed by the setting of a variable voltage power supply 26. The voltage on power supply 26 is in turn adjusted by a control element 28. X-rays generated in that portion of the electron beam 12 which is "seen" by detector 25 may be detected by X-ray detector 25, provided that their direction is aligned with the directional opening in collimator 15. The X-ray detector 25 may be any conventional X-ray detector such as a proportional counter or scintillation counter. This detector must, however, be energy responsove; that is, it must provide output signals which are indicative of the energy of the incident X-rays. The output signals from the detector 25 are coupled to a discriminator 27, whose output in turn is connected to a ratemeter 21. The discriminator 27 may be any conventional pulse discriminator arranged to allow pulses only of a specific amplitude to pass to the ratemeter 21. The amplitude at which pulses are allowed to pass may be varied by adjusting the discrimination level in the discriminator 27. This adjustment is also controlled by the control unit 28, so that for changes in electron beam energy corresponding changes in detector discrimination level can be made. The control unit 28 may take the form, for example, of ganged potentiometers, one changing the energy of the electron beam and the other a bias voltage in a discriminator circuit.

In operation, the electron beam energy is set at a value sufficiently above the absorption edge of the element in the atmosphere to be measured to excite characteristic K-X-rays. For example, the absorption edge of argon is 3.2 kev. and electron beam energy of 12 kev. is needed. The characteristic K-X-rays of argon have an energy of at 2.9 kev. and hence the detector discriminator is set at an amplitude level corresponding to this energy.

Figure 3:
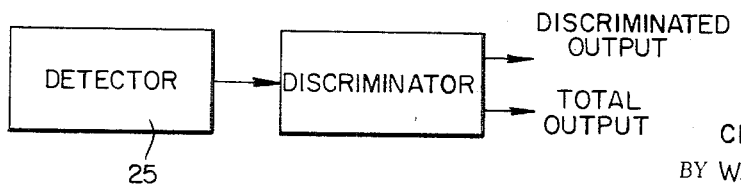
FIG. 3 is a block diagram of an apparatus in accordance with the principles of this invention for measurement of the density and composition.

In FIG. 3 a block diagram of a measuring system for determining both compositions and density is shown. In the system of FIG. 3, the discriminator 29 coupled to the output of detector 25 itself provides more than one output. On one output may be provided pulses corresponding to incident rays of energy characteristic of a selected component of the atmosphere, while on another output may be provided pulses corresponding to X-rays of all energies incident upon the detector.

It will be realized that there is present in any X-ray detector a component of response due to environmental radiation, i.e., from cosmic rays and naturally occurring radioisotopes. By suitable and well known means the detector and the associated electronic circuitry used to measure the X-rays can be made relatively insensitive to radiation from the environment and, in addition, the magnitude of environmental radiation (ionizing radiation) is very small as compared to the X-rays generated in the air by the electron gun. This is an advantage of this invention over methods based on ultraviolet light or electron-induced gas fluorescence where in some applications environmental ultraviolet radiation forms the largest component of the measured response and constitutes a serious hindrance to accuracy and sensitivity.

It will be readily apparent that by use of previously-described mechanical and electrical means, this invention has other forms than the particular embodiments described. Thus, the electron beam can be pulsed or both the electron beam and the detector modulated to conserve power and improve the signal-to-background ratio. Also, either the electron beam or detector or both can be arranged to scan either mechanically or electronically, with or without synchronism. Further, it is obvious that a plurality of electron guns or detectors or both may be used.

The invention has been described with reference to preferred embodiments and it is to be understood that many obvious amendments and modifications will be apparent to those skilled in this art without departing from the spirit and scope of this invention, which is defined in the appended claims.

What is claimed is:

1. A device for measuring the characteristics of a gas in a rarefied gaseous medium including a specified component comprising a source of a well-defined electron beam having a quantum energy in excess of the absorption edge of said specified component, means for directing said electron beam into said rarefied gaseous medium and means for detecting the X-ray radiation produced in a selected volume of gas within said beam and means for providing an output indication of the amount of said X-ray radiation which has an energy characteristic of the K-X-rays emitted from said specified component and means for indicating the total amount of X-rays produced in said selected volume of gas.

2. Apparatus in accordance with claim 1 wherein said X-ray detecting means includes a radiation detector providing output signals at an amplitude corresponding to the energy of the incident X-rays and said detecting means includes discriminator means for providing as an output only those pulses falling within an amplitude corresponding to the characteristic energy of K-X-rays from said specified component.

3. Apparatus in accordance with claim 1 wherein means are provided to measure a small constant fraction of said electron beam and to compare said constant fraction with said measured X-ray radiation.

4. A device for measuring the amount of argon in a rarefied gaseous medium comprising a source of a well-defined beam of electrons having energies in the range of approximately 12 kev., means for directing said beam into a rarefied gaseous medium, means for detecting the X-ray radiation produced in a selected volume of gas within said beam and means providing an output indication of the number of said X-rays having an energy of substantially 2.96 kev.

5. A device for measuring the amount of a specified component in a rarefied gaseous medium comprising an electron gun whose beam is directed into such a medium, means for establishing the quantum energy of electrons in said beam at a sufficiently high level to excite characteristic K-X-rays from said specified component and non-parallel X-ray detecting means directed into said medium so that its line of sight intersects said beam and means providing an output indication of the number of detected X-rays having an energy characteristic of the K-X-rays of said specified component.

References Cited
UNITED STATES PATENTS

| | | | |
|---|---|---|---|
| 2,752,504 | 6/1956 | McKay | 250—83.3 X |
| 2,926,257 | 2/1960 | Friedman | 250—51.5 |
| 2,952,776 | 9/1960 | Schmacher et al. | 250—43.5 X |
| 3,146,347 | 8/1964 | Ziegler | 250—49.5 |
| 3,154,681 | 10/1964 | Ziegler | 250—43.5 |

RALPH G. NILSON, *Primary Examiner.*

ARCHIE R. BORCHELT, WILLIAM F. LINDQUIST,
*Examiners.*